Feb. 23, 1932.    J. DISTER    1,846,319
APPARATUS FOR PREPARING DRUMHEAD CAN BODIES
Filed Aug. 21, 1929    3 Sheets-Sheet 1

INVENTOR
Joseph Dister
BY
John C. Carpenter
ATTORNEY

Feb. 23, 1932.    J. DISTER    1,846,319
APPARATUS FOR PREPARING DRUMHEAD CAN BODIES
Filed Aug. 21, 1929    3 Sheets-Sheet 2
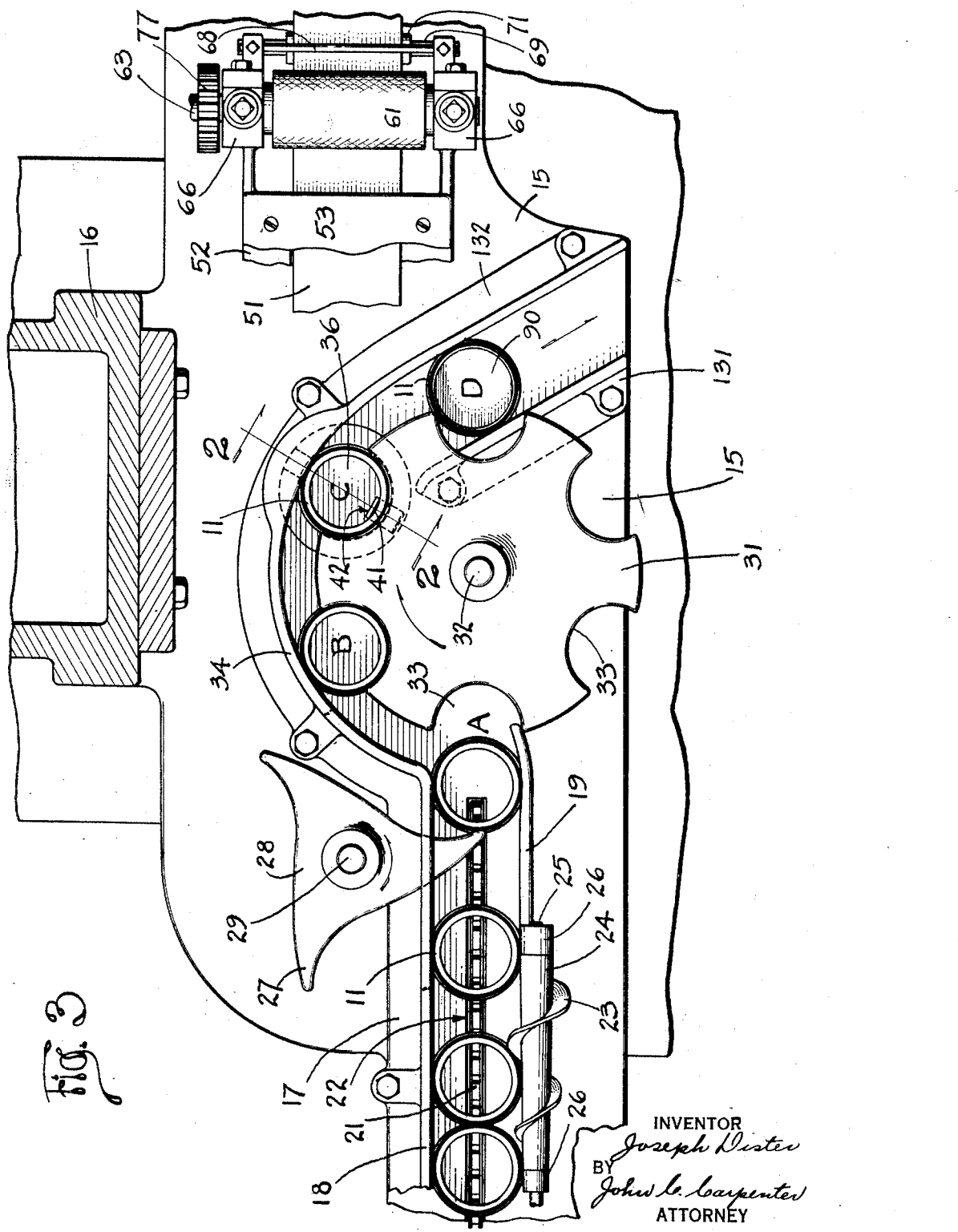
INVENTOR
Joseph Dister
BY
John G. Carpenter
ATTORNEY

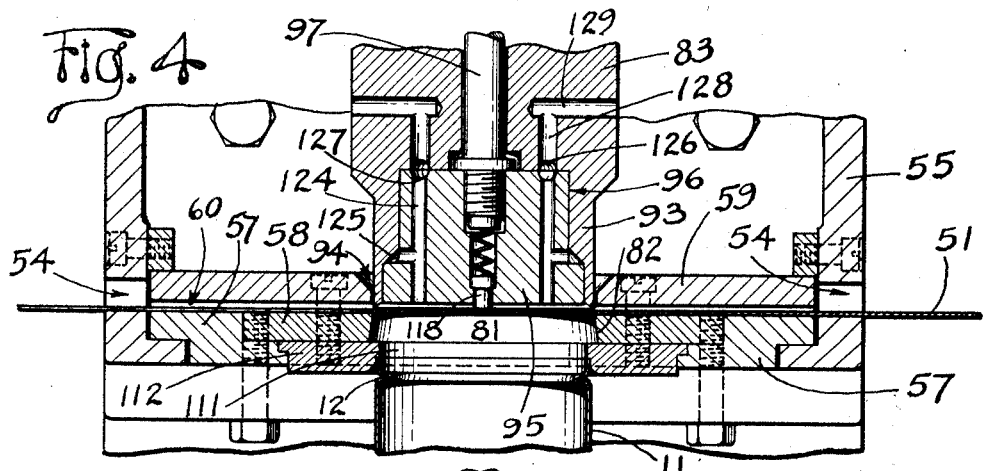
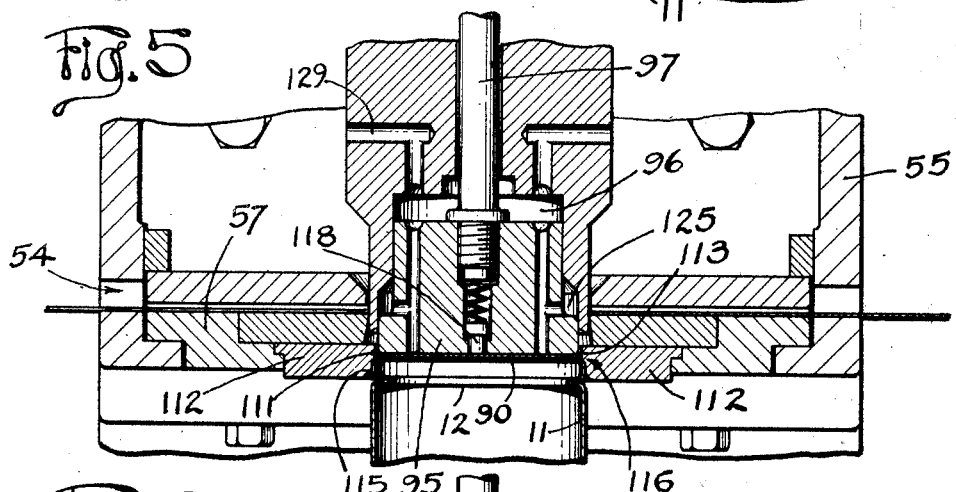
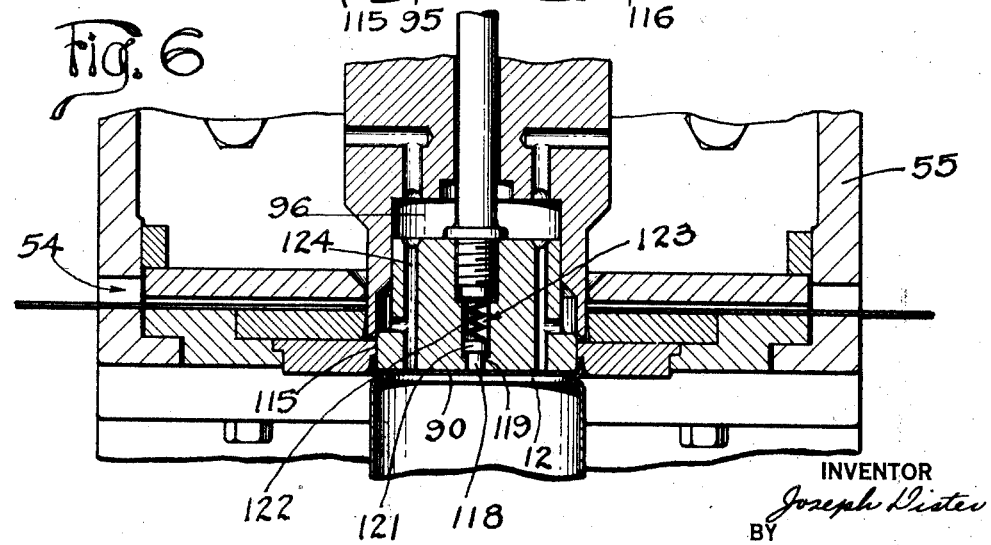

Patented Feb. 23, 1932

1,846,319

UNITED STATES PATENT OFFICE

JOSEPH DISTER, OF HAMILTON, OHIO, ASSIGNOR TO AMERICAN CAN COMPANY, OF NEW YORK, N. Y., A CORPORATION OF NEW JERSEY

APPARATUS FOR PREPARING DRUMHEAD CAN BODIES

Application filed August 21, 1929. Serial No. 387,538.

The present invention relates to an apparatus for preparing drum head can bodies and has particular reference to such an apparatus for performing certain operations in connection with providing a suitable drum head and assembling it within a can body.

The usual type of drum head can which is partially prepared by the apparatus of the present invention comprises a metallic can body having a bottom or end member and a frangible drum head forming a seal for the top of the can. A supplemental cover of the friction or slip cover type is usually used in connection with the sealed drum head and this forms a protection for the drum head prior to its being cut out in the first opening of the can, after which this supplemental cover provides a reclosure. The apparatus of the present invention relates to cutting and forming a drum head and inserting it into the open end of a can body which has been previously beaded to provide a supporting shoulder for the drum head.

The principal object of the present invention is the provision of an apparatus for cutting a drum head from a strip of sheet material and inserting it into a can body.

A further important object of the invention is the provision of a drum head forming and inserting mechanism arranged at a single station and operating in axial alignment with a can body.

Still another important object of the invention is the provision of an apparatus that automatically receives can bodies in untimed relationship, which segregates and times an individual can body and presents it to mechanisms which operate to cut a drum head from a strip of sheet material and insert it within the end of the can body.

An important object of the invention is the provision of an apparatus for holding the upper edge of a can body in true form to receive a drum head which is inserted automatically within the end of the can body so held.

Numerous other objects and advantages of the invention will be apparent as it is better understood from the following description, which, taken in connection with the accompanying drawings, discloses a preferred embodiment thereof.

Referring to the drawings:

Fig. 3 is a sectional plan view taken substantially along the line 3—3 in Fig. 1.

Fig. 4 is an enlarged sectional detail taken through the drum head cutting, forming and inserting mechanisms illustrating these mechanisms in initial operating position and the can in raised drum head receiving position, the section being taken parallel to the front of the apparatus.

Fig. 5 is a view similar to Fig. 4 showing the parts in a different position, the drum head having been cut and formed.

Fig. 6 is a view similar to Fig. 4 illustrating the drum head fully inserted into the can body.

Figure 1:
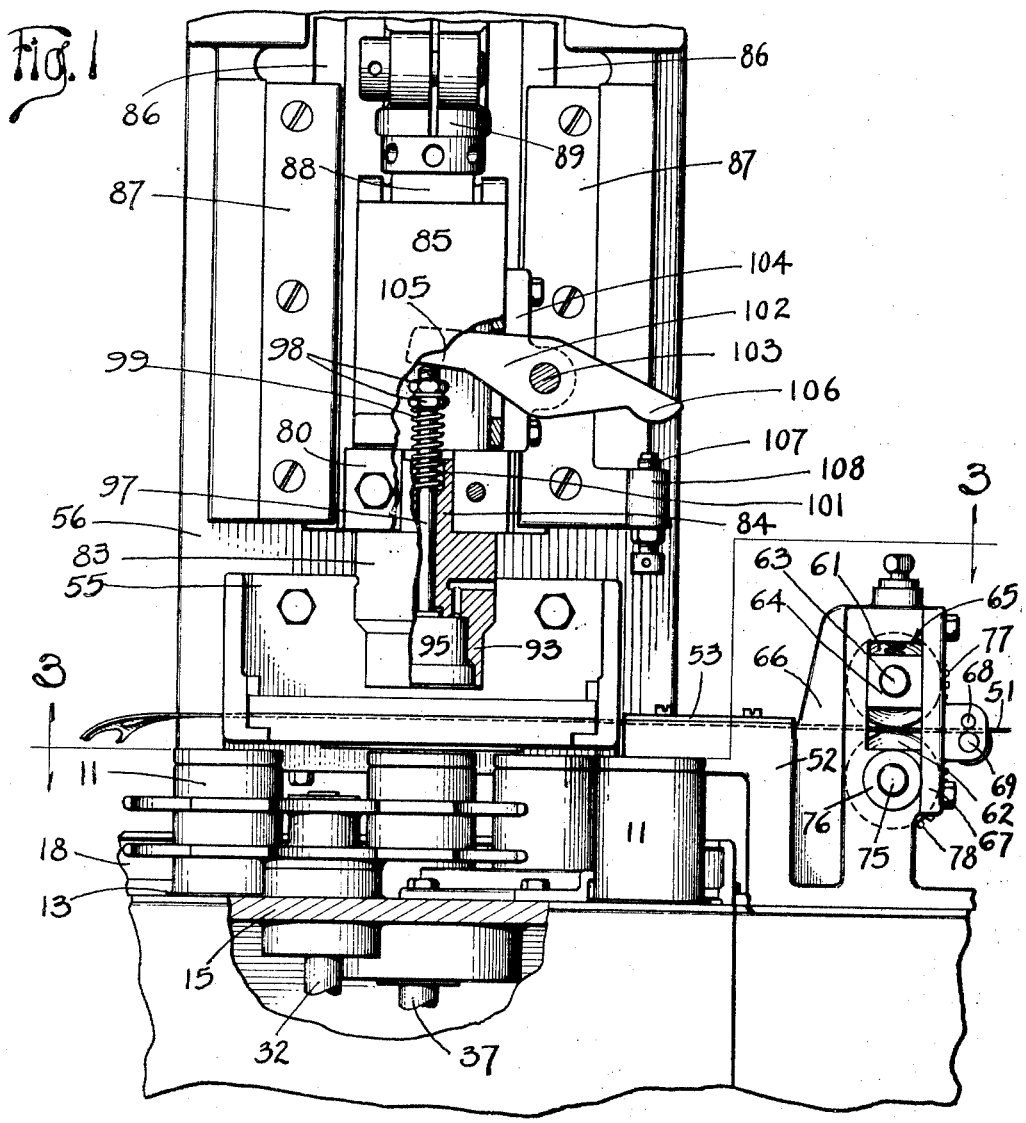
Figure 1 is a front elevation, (parts being omitted and parts being shown in section) of an apparatus embodying the present invention.

In the machine disclosed in the drawings, the operation of drum head cutting, forming and inserting is shown in connection with a cylindrical open-ended can body 11 (Figs. 1 and 2) provided with a supporting shoulder 12 formed near one end and having a flange 13 at its opposite end. When this type of can body is provided with a drum head, the upper or shouldered end of the can will be used as a bottom until after the can has been filled. A can end constituting the true bottom of the can will then be double seamed or otherwise secured to the flange 13. This type of can is here used for illustrative purposes only, the invention applying equally well to other types of can bodies, as for example, a can body 11 provided with a previously attached bottom end.

The apparatus of the present invention comprises a horizontal table on which the shouldered can bodies 11 are brought into the machine by a chain conveyor which moves the cans adjacent a retarding and separating device. This latter device segregates a single can from the untimed mass of cans being delivered into the machine. A timing device then transfers a segregated can from the retarding and separating device and places it into the pocket of a turret constituting, in the present instance, a can body carrier. This carrier moves the cans over the surface of the table and brings each can into a rest position at an assembling station.

A web or strip of sheet material is fed through the assembling station by feeding devices. At certain timed periods, mechanism arranged at this station cuts a disc or drum head from the strip, this mechanism being mounted upon a crosshead having vertical movement relative to the table. After severance, the disc or drum head is moved downwardly and is preferably cupped or formed at its edges. While so held, mechanism mounted upon the descending crosshead next operates to insert the formed disc or drum head within the top of the can.

Simultaneously with this drum head cutting and forming, the can body is lifted and its upper end placed within a rounding-up pocket. The can body, with its inserted drum head is then moved by the can body carrier from the assembling station and discharged out of the apparatus. Suitable operations may subsequently be performed upon the upper end of the can body such as curling of the upper edge or clinching the same to securely hold the edges of the inserted drum head, but this forms no part of the present invention and may be embodied in any suitable mechanism providing the proper connection between drum head and can body.

The can bodies 11 in their passage through the machine are moved over a horizontal table 15 (Figs. 1 and 3) which is bolted to a frame 16. Table 15 is formed with an entrance extension table 17 on which is mounted spaced guide rails 18 and 19. Incoming can bodies 11 are moved over table 17 and between the guide rails 18 and 19 by a chain conveyor 21 operating in the usual and preferred manner, the upper run of the chain passing along a slot 22 formed in the table 17.

The can bodies 11 rest lightly on the conveyor 21 and engage a retarding and separating device comprising a spiral thread 23 (Fig. 3) formed on a sleeve 24 and rotating with a horizontal shaft 25 journaled in bearings 26 mounted on the table 17. As the foremost can body 11 is brought along the side of the sleeve 24, it first engages the small end of the spiral thread 23 and being continually urged forward by the conveyor 21 continues to crowd against the thread as sleeve 24 rotates. This contacting tangent point between can body and thread moves forward at a slower speed than any given point on the conveyor 21 and this action results in retarding the forward movement of the can body, the conveyor chain 21 during such movement slipping therebeneath. The pitch and diameter of the thread 23 is such as to cut out or separate an advancing can body 11 from the can bodies following when the former is released from the thread and again advanced by the conveyor as illustrated in Fig. 3.

The segregated can body 11, after passing beyond the large end of the spiral thread 23 is moved forward at a greater rate of travel by the conveyor chain 21 and is brought in front of an arm 27 of a timing device comprising a starwheel 28 mounted upon a vertical shaft 29. Shaft 29 and starwheel 28 are constantly rotating in proper synchronism with the rotating thread 23, sleeve 24 and conveyor chain 21, one of the arms 27 engaging the advancing can body and positioning it within a can body carrier.

The can body carrier comprises a horizontal turret 31 mounted on a vertical shaft 32 and provided with spaced can body receiving pockets 33. Shaft 32 and turret 31 are moved intermittently in synchronism with the rotating starwheel 28 and a can body 11 advanced by the starwheel is positioned within one of the pockets 33, the turret 31 being on its rest period at such a time.

In this position the can body 11, which passed beyond the conveyor chain 21, rests upon the table 15. Upon the next step movement of the turret 31 the can body is advanced in an arcuate path of travel being confined within its turret pocket 33 by a circular guide rail 34 mounted on table 15. Guide rail 34 is an extension of the guide rail 18 and insures the proper line of travel for the can body. This arcuate, intermittent movement of the can body carrier continues the can body moving from a station A (Fig. 3) through an idle station B and then coming to rest at an assembling station C. It is at the assembling station where a drum head is cut, formed and received within the can body while so positioned.

Can body 11, coming into station C moves on to the upper surface of a can lift plunger 36 (Figs. 1 and 2) seated within the table 15 and secured to the upper end of a vertical shaft 37. This plunger constitutes a movable support for the can body which is independent of the carrier 31. The upper surface of plunger 36 at such time is flush with the upper surface of the table 15 and as the can body 11 moves thereover its lower flange 13 at one side moves under a shoulder 38 formed in the plunger 36 and at the opposite side under a shoulder 39 formed in a block 41 having horizontal sliding movement within a pocket 42 formed in the plunger 36. A spring 43 interposed between a part of the plunger 36 and the block 41 urges the shoulder 39 toward the shoulder 38, and the flange 13 of the can body 11 upon moving into position between the shoulders 38 and 39 forces the block 41 backwardly against the spring 43. This construction and relation of parts firmly clamps the can body in position upon the upper surface of the plunger holding it against both lateral and vertical displacement.

A web, or strip 51 (Figs. 1 and 3) of sheet material, is moved through the assembling station C and over a can body 11 positioned on the plunger 36. Web 51 is moved through a slot formed in the upper surface of a bracket 52 carried by the table 15. A retaining plate 53 fastened to the bracket 52 prevents displacement of the strip 51 during feeding movement and after passing through the slot it passes into and through slots 54 (Figs. 1, 4, 5 and 6) formed in a bracket 55 bolted on the face of an extension frame 56 projected upwardly from the frame 16. Bracket 55 carries two plates 57 and 58 and strip 51 passes over the upper surfaces thereof and beneath a retaining plate 59 carried by bracket 55. This construction provides a space 60 between the plates 57, 58 and the plate 59 through which web 51 moves in its passage through the assembling station C.

Figure 2:
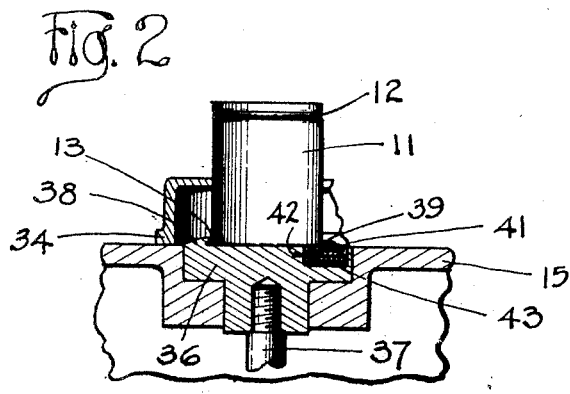
Fig. 2 is a fragmentary detail in section taken substantially along the line 2—2 in Fig. 3.

A strip feeding device is provided for moving web 51 which embodies an upper roller 61 and a lower roller 62 (Figs. 1 and 3). Roller 61 is fixed on a horizontal shaft 63 and is carried in bearing blocks 64 sliding within slots 65 formed in spaced brackets 66 connected with the bracket 52 and carried by the table 15. Blocks 64 are held within their slots 75 by a retaining plate 67 secured to the brackets 66. Horizontal guide rods 68 and 69, the latter carrying spaced discs 71, are carried by brackets 66 and these keep web 51 in proper alignment for the feed rollers.

Roller 62 is fixed on a horizontal shaft 75 rotatably mounted in bearings 76 formed in brackets 66. Shaft 63 may be extended and suitably rotated in the usual and preferred manner and gears 77 and 78 carried respectively by shafts 63 and 75 insure uniform rotation of the feeding rollers 61 and 62.

Strip 51 while in slot 60 at station C is engaged by cutting mechanism which severs a drum head or disc therefrom. For this purpose, plate 58 is provided with a central opening 81 (Fig. 4) and the walls surrounding this opening constitute a die cutedge 82 which cooperates with other disc cutting mechanism. This latter mechanism is confined within a punch block 83 (Figs. 1 and 4) which is provided with a stem 84 by which it is clamped to the lower end of a crosshead 85 by clamp block 80. Crosshead 85 is provided with the usual type of extensions 86 operating in vertical guide ways formed in side plates 87 bolted to the face of the frame part 56. Crosshead 85 is pivotally connected at 88 to a pitman 89 of the usual and preferred press construction. Pitman 89 and crosshead 85 are suitably operated, as for example, by connection with a standard form of press crankshaft.

Punch block 83 is reduced in diameter at its lower end forming a punch cutting member 93. Punch member 93 upon moving downwardly with block 83 passes through an opening 94 extending through the plate 59 and engaging the strip 51, presses it against cutedge 82. Continuing its movement the punch passes through the strip 51 severing a disc 90 therefrom.

During this cutting action a punch center 95, positioned within a chamber 96 inside of the member 93, forms a backing for the strip 51 and the disc 90 cut therefrom. Punch center 95 is secured to the lower end of a stem 97 extending vertically through a central bore in block 83 and when the punch center 95 is thus acting as a backing member, it is in the upper end of the chamber 96.

The disc 90 just severed from the strip 51 is carried downwardly with the descending punch block 83 and parts carried thereby and as the punch block approaches the end of its stroke punch center 95 is moved outwardly and in advance of the moving member 93. This is accomplished by mechanism illustrated in Fig. 1 which comprises the following parts. Stem 97 at its upper end is threaded and locknuts 98 are adjustably secured thereto confining on the upper part of the stem a coil spring 99, the lower end of the spring resting within a counter bore 101 formed in the upper end of stem 84. Spring 99 normally holds stem 97 in raised position, this in turn, holding punch center 95 at the upper end of the chamber 96, the top surface of the punch center in such a position engaging the top wall of the chamber.

A knockout lever 102 is carried by the crosshead 85 being pivoted on a rod 103 held by a bracket 104 bolted to the side of the crosshead. An inner arm 105 of the lever rests against the upper end of the stem 97 being held in position by gravity. An outer arm 106 of the lever 102 is in alignment with the upper end of an adjustable bolt 107 threadedly secured in a boss 108 carried by the side plate 87. As crosshead 85 approaches the end of its downward stroke, arm 106 of lever 102 strikes against the bolt 107 and is arrested in its downward movement as the crosshead and lever pivot 103 continue their movement.

This action rocks lever 102 on its pivot 103 and its arm 105 depresses the stem 97. Punch center 95 (Fig. 5) is thus advanced ahead of member 93, the former pressing against the cut disc 90 and forcing it into an opening 111 formed in a plate 112 resting beneath and in contact with the plate 58, plate 112 having shouldered connection with the plate 57 (Fig 5).

Member 93 still continues its downward movement and punch center 95 does likewise but at a greater rate of travel and this forces the discs 90 through the opening 111 turning up the edges of the disc to form a peripheral flange 113 converting the flat disc into a flanged cup shaped disc.

While the disc cutting and forming actions just described are taking place, can 11 is being raised into disc receiving position. This is accomplished by the lifting of the plunger 36 by actuation of its stem 37 (Figs. 1 and 2) in a usual and preferred manner so as to move the can body end-wise relative to the disc-forming means. The upper end of the can body 11 is thereby moved into a rounding-up openings 115 (Figs. 5 and 6) former centrally of the plate 112 and in axial alignment with the punch center 95. Seating of the can body 11 within the opening 115 rounds up or irons out any irregularities which may exist in the upper edge of the body and while so held this edge is of smooth and regular form.

Opening 115 is surrounded by a shouldered wall 116 which forms a stop for the upper end of the can body as it is brought fully into raised position. Opening 111 is of less diameter than the opening 115 by an amount equal to the difference between the inside and outside diameters of the can body 11 at its upper end and the inner wall of the fully seated can body is thus flush with the wall surrounding the opening 111.

By the time that punch center 95 and punch member 93 have completed the forming operation on the disc 90, can body 11 is fully seated within its rounding up opening 115, this position being illustrated in Fig. 5. Continued downward movement of the punch parts, (the punch center 95 moving at a greater rate than the punch member 93), forces the disc 90 into the upper end of the positioned can body 11 and deposits it on the shoulder 12, as illustrated in Fig. 6. At this time, the punch parts have reached the limit of their downward movement and the assembling operation is thus completed.

Slide 85 and punch block 83 then begin their upward movement, punch center 95 moving back at greater speed into its chamber 96, the member 93 withdrawing from the plate 58. Disc 90 is prevented from moving upwardly with the punch center 95 by a knockout pin 118 slidably positioned within a central opening 119 formed in the center block 95. Pin 118 is provided with a head 121 that is engaged by the lower end of a coil spring 122 positioned within a vertical bore 123 formed in the central part of the punch center 95. As punch center 95 moves upwardly, pin 118 is pushed outwardly by its spring 122 and disc 90 is thus stripped or knocked off from the punch center.

During the relative movements between punch center 95 and member 93 as the parts move up and down, air is permitted to flow freely into and out of the chamber 96. Vent channels 124 formed in the punch center 95 communicate with an annular opening 125 in member 93 and with annular grooves 126 and 127 formed respectively in members 83 and 95. Other vent channels 128 are formed in the punch block 83, which communicate with the grooves 126 and 127 and connect with channels 129 leading to the atmosphere. These vented passages prevent rarefaction or compressing of air within the chambers and prevent sticking of the disc 90 to the punch center.

With the upward movement of crosshead 85 and its punch parts downward movement of plunger 36 takes place and by reason of the shoulders 38 and 39 associated with the plunger 36 can body 11 with its inserted drum head 90 is moved downwardly and away from the plate 112. As plunger 36 reaches its normal lowered position, can body 11 is again brought in the plane of the upper surface of the table 15.

Upon the next step rotation of the turret 31 which follows, can body 11 is moved over the table and brought into the discharge chute to a position marked D in Fig. 3. Here the can body 11 is confined between guide rails 131 and 132 and as subsequent drum-headed can bodies 11 are moved over the table and brought into the discharge chute, they push against the can bodies already there and gradually move the same along the chute and out of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In an apparatus for preparing drum head can bodies, the combination of feeding devices for feeding a strip of sheet material, instrumentalities for cutting a drum head from said strip, a movable can body carrier, and means for inserting said drum head into a can body brought into inserting position by said carrier, and means for moving the can body endwise relative to said inserting means.

2. In an apparatus for preparing drum head can bodies, the combination of feeding devices for feeding a strip of sheet material, instrumentalities for cutting a drum head from said strip, forming members for shaping said drum head, a movable can body carrier, a movable support for the can body independent of the carrier, and means for inserting said formed drum head into a can body brought into inserting position by said carrier.

3. In an apparatus for preparing drum head can bodies, the combination of a movable can body carrier adapted to position a can body at an assembling station, feeding devices for feeding a strip of sheet material through said station, instrumentalities at said station for cutting a drum head from said strip, and means for inserting said drum head into a can body positoned at said assembling station, and means for moving the can body endwise relative to said inserting means.

4. In an apparatus for preparing drum head can bodies, the combination of a movable can body carrier adapted to position a can body at an assembling station, a movable support for the can body independent of the carrier feeding devices for feeding a strip of sheet material through said station, instrumentalities at said station for cutting a drum head from said strip, aligning members located at said station for holding said can body in drum head receiving position, and means for inserting said drum head into the can body so held.

5. An apparatus for preparing drum head can bodies comprising in combination, a movable can body carrier, a can body conveyor, a timing device for feeding can bodies from said conveyor to said carrier, instrumentalities for cutting a drum head from a strip of sheet material, and means for inserting the drum head so cut into a can body in said carrier.

6. An apparatus for preparing drum head can bodies comprising in combination, a can body conveyor for receiving can bodies in untimed relation, retarding and separating members for segregating an individual can body, a movable can body carrier, a timing device for transferring said segregated can body in timed relation to said carrier, instrumentalities for cutting a drum head from a strip of sheet material, and means for inserting the drum head so cut into a can body in said carrier.

7. An apparatus for preparing drum head can bodies comprising in combination, a can body conveyor for receiving can bodies in untimed relation, retarding and separating members for segregating an individual can body, a movable can body carrier, a timing device for transferring said segregated can body in timed relation to said carrier, feeding devices for feeding a strip of sheet material, instrumentalities for cutting a drum head from said strip, and means for inserting the drum head so cut into a can body in said carrier.

8. An apparatus for preparing drum head can bodies comprising in combination, a rotatable turret provided with can body receiving pockets, a can body conveyor, a timing device for transferring a can body from said conveyor into a pocket of said turret, instrumentalities for cutting a drum head from a strip of sheet material, and means for inserting the drum head so cut into a can body while positioned in said turret.

9. An apparatus for preparing drum head can bodies comprising in combination, a rotatable turret provided with can body receiving pockets, a can body conveyor, a timing device for transferring a can body from said conveyor into a pocket of said turret, instrumentalities for cutting a drum head from a strip of sheet material, forming members for shaping said drum head, and means for inserting the said drum head into a can body while positioned in said turret.

10. An apparatus for preparing drum head can bodies comprising in combination, a feed table provided with an operating station, a can body carrier for conveying can bodies over said table to the operating station, a crosshead located at said station and having vertical movement relative to said table, a strip support located adjacent said station, feeding devices for moving a strip of sheet material over said support and past said station, instrumentalities associated with said crosshead and said support for cutting a drum head from said strip, and means for inserting said drum head into a can body positioned at said station on downward movement of said crosshead.

11. An apparatus for preparing drum head can bodies comprising in combination, a feed table provided with an operating station, a can body carrier for conveying can bodies over said table to the operating station, a crosshead located at said station and having vertical movement relative to said table, a strip support located adjacent said station, a can body truing pocket mounted on said support, feeding devices for moving a strip of sheet material over said support and past said station, instrumentalities associated with said crosshead and said support for cutting a drum head from said strip, positioning devices for moving the upper end of a can body at said station into said truing pocket, and means for inserting said drum head into said can body on downward movement of said crosshead.

JOSEPH DISTER.